No. 831,256. PATENTED SEPT. 18, 1906.
A. WOLLENSAK.
PHOTOGRAPHIC SHUTTER.
APPLICATION FILED MAY 23, 1905.
3 SHEETS—SHEET 1.
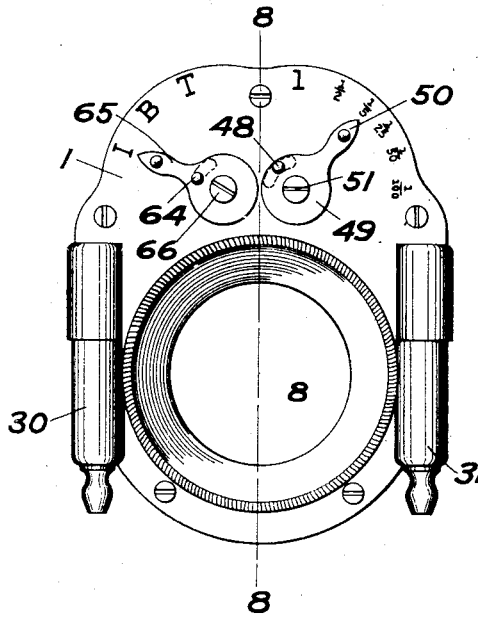
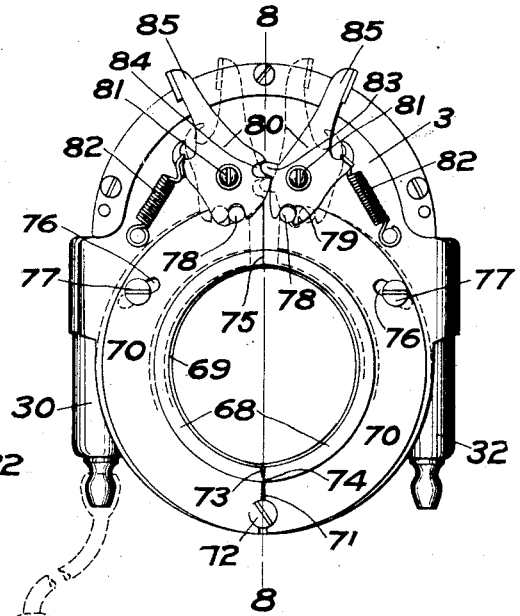
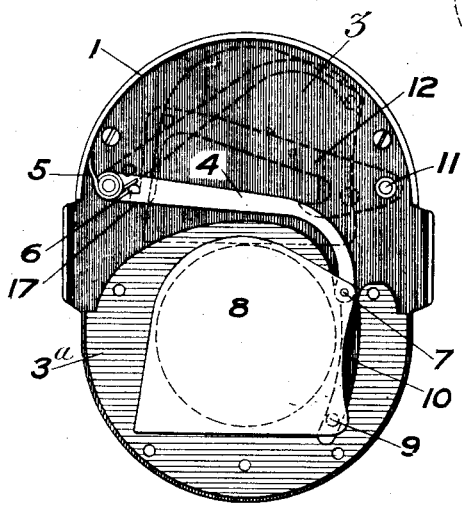
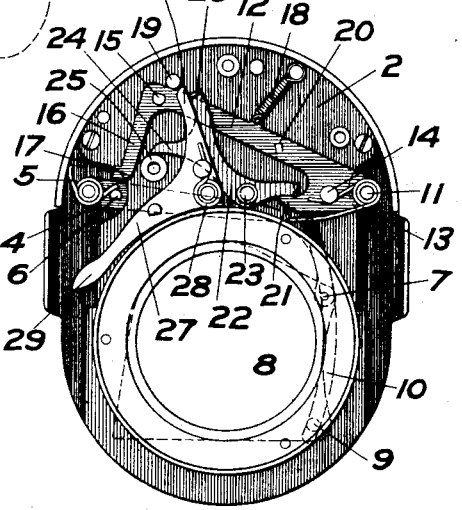
WITNESSES:
D. Gurnee
Clarence W. Carroll
INVENTOR:
Andrew Wollensak
by Osgood & Davis
his Attys

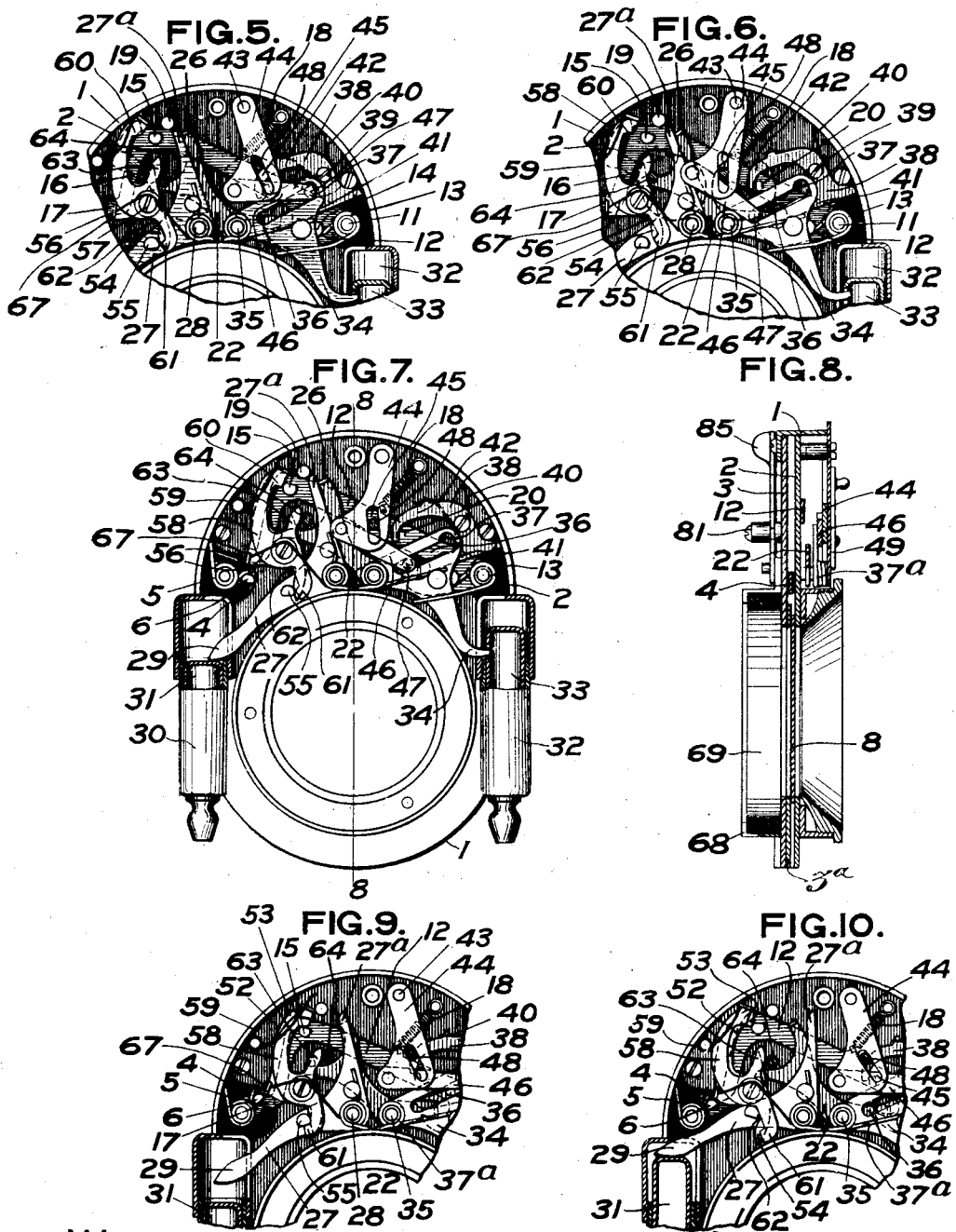

No. 831,256. PATENTED SEPT. 18, 1906.
A. WOLLENSAK.
PHOTOGRAPHIC SHUTTER.
APPLICATION FILED MAY 23, 1905.

3 SHEETS—SHEET 3.

WITNESSES:

INVENTOR:

UNITED STATES PATENT OFFICE.

ANDREW WOLLENSAK, OF ROCHESTER, NEW YORK, ASSIGNOR TO WOLLENSAK OPTICAL COMPANY, OF ROCHESTER, NEW YORK, A CORPORATION OF NEW YORK.

PHOTOGRAPHIC SHUTTER.

No. 831,256.　　　　Specification of Letters Patent.　　　　Patented Sept. 18, 1906.

Application filed May 23, 1905. Serial No. 261,871.

*To all whom it may concern:*

Be it known that I, ANDREW WOLLENSAK, a citizen of the United States, and a resident of Rochester, in the county of Monroe and State of New York, have invented certain new and useful Improvements in Photographic Shutters, of which the following is a specification.

This invention relates to photographic shutters, and in certain aspects to shutters of the automatic type adapted to make instantaneous exposures of different lengths, besides bulb exposures and time exposures, and to other improvements, as will appear.

Figure 11:
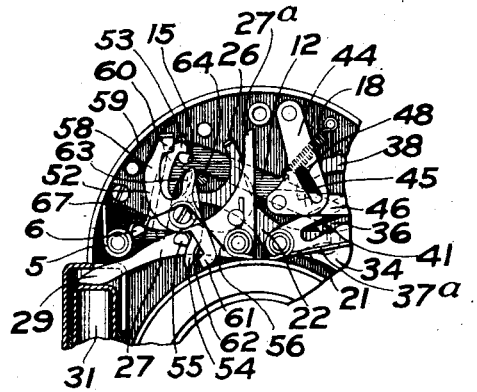
Figure 12:
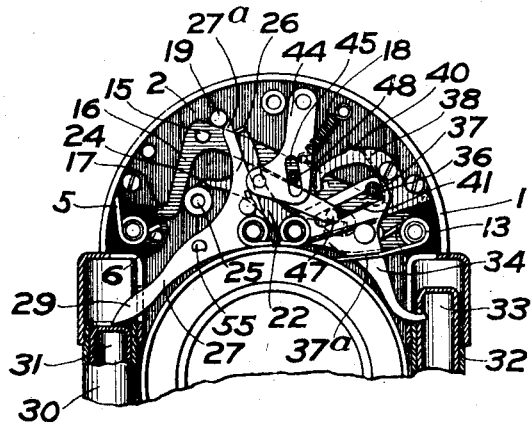

In the drawings, Figure 1 is a front elevation of a device embodying this invention. Fig. 2 is a rear elevation of the same device, showing means of attachment thereof to the front of a photographic lens. Fig. 3 is a front elevation of the shutter, various parts being removed to show the shutter-arm and means for guiding the shutter in its path. Fig. 4 is a front elevation of a portion of the shutter mechanism, the detents, the retarding mechanism, and the setting mechanism being removed with portions of the casing. Fig. 5 is a view of parts of the device, showing the same set for the shortest instantaneous exposure. Fig. 6 is a view of the same parts, showing them set for the slowest instantaneous exposure. Fig. 7 is a view of the mechanism, portions of the casing and other parts being removed and showing all the parts in the normal position of rest. Fig. 8 is a vertical section on the line 8 8 of Figs. 1 and 2. Fig. 9 is a view of parts of the operating mechanism, showing them in their positions while the shutter is open during a time exposure. Fig. 10 is a view of the same parts in their positions when, after a time exposure, the shutter is beginning to close. Fig. 11 is a view of the same parts while the shutter is open during a bulb exposure; and Fig. 12 is a view of the parts employed in instantaneous exposures, including the retarding mechanism, the other parts being removed.

The apparatus is contained in a case 1, having in it two plates 2 and 3, Fig. 8, perforated for the passage of light through the lens. In the present form of device the supplementary plate 3ª (see Figs. 3 and 8,) is fastened to the plate 3 and has an opening opposite which the shutter moves. On the rear side of the plate or partition 2 is pivoted the shutter-lever 4, (see Fig. 3,) having a motor-spring 5, in the present case coiled around the pivot of the lever and pressing at one end against a stationary abutment, such as a portion of the case, and at the other end against a lug or pin 6 upon the lever. The spring 5 actuates the shutter lever or arm 4 to close the shutter from the position shown in dotted lines in Fig. 3, to the position shown in full lines in said figure. The shutter-lever is pivoted at 7 to the shutter-leaf 8, and the shutter has a pin or projection 9 situated at some distance from the pivot 7, and which runs in a guide or groove 10 in some part of the shutter or its casing, such as the plate or partition 3ª. The shutter moves upward and downward, as shown in Fig. 3, and between the plates 2 and 3ª.

On the front of the plate 3 is pivoted at 11 the spring-operated master-lever 12, having an actuating-spring 13, in the present instance coiled around the pivot 11 and having one end pressing against a stationary portion of the shutter-casing and the other end pressing against a pin or projection 14 on the master-lever. At the opposite side of the case the master-lever carries a detent-pin 15 and a spring end 16, adapted to slip over the beveled top of the pin 6 and by a terminal projection 17 to engage under said pin, as shown in dotted lines in Fig. 3. A second spring 18, fastened to the casing and to the master-lever, supplements the spring 13. The master-lever in its upper or normal position of rest is stopped in correct position by a stationary pin 19. The master-lever also bears a lug or projection 20 for a purpose to be explained below and an arm 21 much shorter than the master-lever. The master-lever spring 13 is stronger than the shutter-spring 5.

The arm 21 of the master-lever is always in contact with one arm of the trip-lever 22, which lever is pivoted to the case between its ends at 23 and is provided with an arm 24, adapted to make contact with a projection 25 in the casing to stop the trip-lever in its exact normal position of rest. The trip-lever has also an arm having a beveled end 26 for engagement with one arm 27ª of the operating-lever 27. This arm of the operating-lever when moved toward the left in Fig. 4 is adapted to slide over the said beveled end 26, so that when the said arm of the operating-lever moves toward the right it will carry with it the trip-lever. A spring 28, acting upon the operating-lever 27, tends to move its above-mentioned end toward the left in Fig. 4 and to depress its other end 29, actuated by a pneumatic releaser, which in the present case is a pump 30, fastened to the casing and having a piston 31 for engaging and raising the end 29 of the operating-lever.

A retarder is provided for retarding the action of the master-lever-spring 13 in order to produce instantaneous exposures of different lengths. This in the present instance is a dash-pot device 32, having a plunger 33 fitting the body 32 of the dash-pot rather loosely, so that when the plunger 33 is raised air is drawn into the empty space produced by such raising. The plunger 33 has a rather long bearing-surface in the interior of the body 32 and protrudes from the top of said body as it is raised, and consequently as the plunger rises the constricted space between the plunger and its body for the passage of air into the interior is gradually decreased, whereby under the impulse of a uniform force as the plunger rises its speed will increase, and consequently the speed of the shutter in opening will increase with the plunger. Connected to said plunger is a retarder-lever 34, pivoted to the case at 35 and having in it a slot 36, which has at one end an enlargement 37. The retarder-lever 36 is actuated in one direction by a spring 37ª, which tends to force the plunger 33 downward. Adjacent to and in the present case lying under the retarder-lever 34 is the controlling-lever 38, pivoted to the case at 39 and provided with a spring 40, tending to move the lever around its pivot in the opposite direction to the movement of the retarder-lever 34 around its pivot. The said controlling-lever has an arm 41, which normally registers with the lower edge of the slot 36, and the said controlling-lever has another arm 42, having a spring end adapted when moving upward to slip over the lug or projection 20 on the master-lever and when moving downward to engage said lug or projection and to depress the master-lever; but when a particular position of these parts is reached the end of the said arm 42 slips off the lug or projection 20 and permits the master-lever to rise to its normal position under the action of its spring 13. Within the casing is a pivot 43 for the regulating-arm 44, having a slot 45 and pivoted to a link 46, which bears on its free end a pin 47, resting in the slot 36 and against the upper edge of the arm 41. In the slot 45 is a pin 48 of an index-lever 49, pivoted on the front face of the case and provided with a pointer 50, adapted to indicate various values on a scale on said case. In the present instance the values of said scale indicate a difference in speed of the shutter for instantaneous exposures of from one one-hundredth of a second to one second.

It will be seen that as the index-lever moves around its pivot 51 the pin 48 will be moved in the slot 45 and the regulating-arm 44 will be swung from the position shown in Fig. 5 to that shown in Fig. 6, or vice versa. When the pin is in the position shown in Fig. 5, the pointer 50 will register with that indication upon the scale indicating the shortest instantaneous exposure, which in the present instance is one one-hundredth of a second, and the pin 47 will be moved to the extreme right-hand end of the slot 36 and into the enlargement 37. This will produce the shortest instantaneous exposure of which the device is capable. When the index-lever 49 points to that portion of the scale indicating one second, the pin 48 and the parts will take the positions shown in Fig. 6, with the pin 47 in the extreme left-hand end of the slot 36, and the device will produce the slowest instantaneous exposure of which it is capable.

For time and bulb exposures means are provided for holding and releasing the master-lever 12 and the operating-lever 27 in suitable positions. For the bulb exposures a bulb-detent 52, Figs. 10 and 11, is provided, having a hooked end 53, adapted to engage the detent-pin 15 on the master-lever when the master-lever has risen to a point just short of a position in which the parts are released, so that the shutter may close under the influence of its spring 5. The bulb-detent also has a tail 54 of such shape that a pin or projection 55 upon the operating-lever 27 will during the descent of the operating-lever engage the said tail and turn the bulb-detent around its pivot under the action of the spring 28 and release the detent-pin 15 from the hook 53. The said bulb-detent is actuated by a spring 56, coiled around its pivot 57 for throwing the hooked end 53 into position to engage the detent-pin 15 on the master-lever. The pin 55 on the operating-lever 27, acting on the tail 54, turns the bulb-detent against the tension of the spring 56.

Upon the same pivot 57 with the bulb-detent is the time detent 58, actuated by a spring 59, so as to throw a hooked end 60 of said time detent into the path of the detent-pin 15 on the master-lever 12. The hooked ends 60 of the time detent and 53 of the bulb-detent overlap each other. On the opposite side of the pivot of the time detent is a hooked end 61, adapted to move into the path of the pin 55 on the operating-lever 27, which stops the operating-lever in the position shown in Fig. 9, so that the spring end of the operating-lever does not in its return movement pass the beveled end 26 of the trip-lever. In this position of the parts the shutter is held open, because the operating-lever 12 is checked by the engagement of the hooked end 60 of the time detent just before the hooked end 17 of the operating-lever slips off the pin 6 on the shutter-lever 4. The shutter is therefore held open, as shown in Fig. 9. Upon the same arm of the time detent with the stop or hook 61 for the operating-lever is a face 62, which when the time detent is holding the detent-pin 15 on the master-lever is adapted to engage and be tilted by the pin 55 on the operating-lever and to release the detent 15 from the time detent, so that the master-lever is released, and thus releases the shutter-lever and allows the shutter to close. The time detent has a portion 63 adapted to be engaged by a pin 64, extending through the case from an indicator-arm 65, pivoted at 66 and pointing to a scale upon the outside of the case, consisting of the three letters "I," "B," and "T." Movement of the pin 64 around its center by means of the indicator-arm may press upon the portion 63 of the time detent and set it in position, as shown in Fig. 11, so that said time detent is moved to remain out of the path of the pins 15 and 55, which leaves the bulb-detent 52 free to operate. Under these circumstances the device is set for bulb action. This position is the intermediate position, which occurs when the indicator points to the middle letter "B" on the scale. On tipping the indicator-arm to the point marked "I" the time detent engages a projection 67 on the bulb-detent and forces the latter out of the path of movement of either of the pins 15 and 55, so that both detents are moved out of action and the shutter is set for instantaneous exposures.

When the indicator is set to "T," the pin 64 does not press against or actuate either of the detents and both are free to operate to check the operating and master levers.

The operation of the device for instantaneous exposures is as follows: On actuating the operating-lever 27 from the position shown in Fig. 7, so that it rises, for instance, to the position shown in Fig. 11, the spring end of the operating-lever being in engagement with the beveled end 26 of the trip-lever, immediately tilts said trip-lever against the action of the operating-lever spring 28, and this movement tilts the master-lever downward against the action of its spring 13, (and against the action of the spring 18 when this is employed.) In this downward movement the laterally-movable hooked end 17 of the master-lever passes the beveled end of the pin 6 until the said hooked end engages under the said pin. Just before the end 29 of the operating-lever reaches its extreme upper position the spring end 27ª of the operating-lever automatically slips off the hooked end 26 of the trip-lever, (in a manner well known in this art from my Patent No. 691,689,) whereby the stronger spring 13 of the master-lever lifts the shutter-lever 4 against the action of its spring 5 until, just before the master-lever reaches its extreme upper position, the hooked end 17 of the master-lever slips off the pin 6 and allows the shutter to close under the influence of its spring 5. When the master-lever reached its lower position just before engaging the shutter-lever 4, as just described, the lug 20, engaged under the end of the arm 42 of the controlling-lever, and as the shutter-lever rose, the controlling-lever was tilted thereby, and its arm 41 being in engagement with the pin 47, through that pin tilted the retarder-lever 34, so as to raise the plunger 33 with the gradually-increasing speed above described. Since the shutter moves vertically and has a horizontal lower edge, the lower portion of the exposure-opening is uncovered slowly, and the upper portion of the exposure-opening is uncovered more rapidly, so that there will be a slower and longer exposure for the foreground of the picture and a shorter exposure for the sky. This is desirable because of the stronger light of the sky. After this movement of the shutter it is returned and closed by the shutter-spring 5 after different periods of time from the beginning of the opening movement of the shutter, in accordance with the setting of the indicator 49. When the pin 47 is in the outer extremity of the slot 36, it is near to the pivotal point of the controlling-lever 38, and consequently as said controlling-lever is tilted by the master-lever 12 the movement of the retarder-lever will be correspondingly small and, in fact, will be nothing, because the pin lies in the enlarged end 37 of said slot and may move therein without actuating the retarder-lever, notwithstanding the throw of the controlling-lever 38. When the pin 47 is in the other end of the slot 36 near the pivot 35 of the retarder-lever and at the most distant point on the arm 41 of the controlling-lever from its pivot 39, it is clear that when the operating-lever tilts the controlling-lever the pin 47 will receive its maximum movement and the retarder-lever 34 will be raised to its highest point, so that as the length of the exposure increases the stroke of the plunger 33 increases in length, and the return stroke will require periods of time of different lengths, according to the amount of air to be expelled from the retarder-casing 32.

The above actions occur when the indicator 65 is turned to point to "I" on the scale and the indicator 39 is turned to one of the gradations of its scale. In all speeds the increasing opening movement of the shutter occurs, controlled by the retarder, and the closing occurs at a constant speed.

For bulb exposures the indicator 65 is set to point to "B" on the scale, and if the shutter is to open with increasing speed the indicator 49 is set to any point of its scale, except that indicating the most rapid action. By this setting of the indicator 65 the time detent 58 is rendered inoperative, and on actuating the operating-lever 27 the operating-lever tilts until its spring end 27ª slips off the hooked end 26 of the trip-lever and releases the trip-lever and the master-lever, so that the master-lever rises, carrying with it and opening the shutter until the detent 15 is stopped by the hooked end 53 of the bulb-detent, which holds the shutter open. Upon removing lifting pressure from the operating-lever the said lever returns under the action of its spring 28, and the pin 55 on the operating-lever, acting on the tail 54 of the bulb-detent, tilts the bulb-detent and releases the detent-pin 15, which permits the master-lever to complete its upward stroke, whereby the shutter-lever is released and the shutter closes. It is obvious that when a bulb or other means for pressing the operating-lever is used the shutter will remain open as long as pressure is maintained and will close as soon as pressure is relieved.

For time exposures the indicator 65 is set to point to "T," which removes the pin 64 from action upon either of the detent-levers. On raising the operating-lever until the trip-lever is released the detent-pin 15 is engaged by the hooked end of the bulb-detent and the shutter is held open. The operating-lever, however, returns under the action of its spring 28 until by action of the pin 55 on the tail 54 of the bulb-detent the hooked end of said detent is removed from engagement with the pin 15 and the pin 55, and then the operating-lever is held by the hooked end 61 of the time detent in the position shown in Fig. 9, whereby the spring end 27ª of the operating-lever is prevented from passing and reëngaging the hooked end 26 of the trip-lever, so that there is no action upon the operating-lever for moving it onto its highest position; but upon actuating a second time the operating-lever the pin 55 engages the face 62, as shown in Fig. 10, tilts the time detent, and releases the pin 15, allowing the master-lever 12 to move to its highest position to release the shutter-lever and permit the shutter to close.

It will be noted from Fig. 9 that when the pin 55 descends toward the hook 61 after the trip-lever is released it tilts the tail 54 of the bulb-detent, and thereby removes the hooked end 53 from the pin 15, and consequently while the pin 55 is held by the hooked end 61 of the time detent the bulb-detent is held out of operation. The hook of the bulb-detent is slightly closer to the common pivot than the hook of the time detent, and consequently when the bulb-detent is removed from engagement with the pin 15 the pin rises very slightly in order to engage the hook 60 of the time detent, and the end of the hook of the bulb-detent stops against the side of the pin, as shown in Figs. 9 and 10, thus preventing the bulb-detent from reëngaging the pin upon the second actuation of the operating-lever.

The proper position of a shutter of the character above specified, particularly where different exposures are provided for the sky and foreground, is in front of the lens, and for this purpose a mechanism is provided for attaching the above shutter to the front end of the lens-mount. For this purpose two curved tubes 68, each comprising nearly one-half a circle and containing a compressible packing-strip 69, preferably of india-rubber, are employed. The packing-strip may be split for easier expansion and contraction. In the form of the device herein shown the tubes 68 have flanges 70, which are held against the back plate 3 of the shutter-casing by suitable fastenings, permitting the separation and bringing together of the parts of the tube. In the present instance the flange 70 is split, as at 71, preferably on a radial line, and a broad-headed screw 72 passes through the edges of the flanges at the split to hold the flanges at this point against the casing. The tube 68 is also partly split, as at 73, so that a small connecting unsplit portion 74 remains to hinge the parts together. Diametrically opposite to the split 73 the tube 68 and flanges 70 are split completely through, preferably on a radial line 75. At points substantially each one hundred and twenty degrees from the screw 72 are slots 76 in the flanges 70, and broad-headed screws 77 pass through the slots into the back plate 3. These slots are cut on a radius drawn from the hinge or connecting neck 74, above described, so that when the two clamping members, each consisting of the flange 70 and its portion of the tube 68, are spread apart from their division-line 75 the slots 76 will guide their movement correctly. Adjacent to the dividing-line 75 and on each flange 70 is a pin or projection 78, adapted to engage in a notch 79 in a lever 80, pivoted at 81 to the casing and actuated in manner to close the division 75 by a spring 82, connected to the lever and to the casing. In order to compel equal opposite actions of the levers 80, they are suitably connected together, so as to move similarly around their pivots. The method herein shown of causing this similar movement is a tooth 83 on one lever and an indentation 84 on the other lever fitting said tooth. As the free ends 85 of said levers are squeezed together from the position shown in full lines in Fig. 2 to that shown in dotted lines in said figure the springs 82 are put under tension and through the pins 78 the flanges and segments of the tube 68 are separated from their dividing-line 75, so as to enlarge the opening in the tube in order to permit the tube to be set upon the outer end of a lens-mount. The packing-strip 69 makes a light-tight joint. On releasing the levers the springs 82 will cause the tube-segments to come together and to clamp the shutter upon the lens-mount.

This clamping device is the subject of United States Letters Patent No. 819,110, dated May 1, 1906.

What I claim is—

1. In a photographic-shutter device, a shutter, actuating means for actuating the shutter in one direction, a beveled part moving with the shutter, a master-lever having a part adapted to engage and to slip off the said beveled part, a master-lever spring adapted to move said actuating means for actuating the master-lever to move the shutter in the other direction, a trip-lever engaging said master-lever, and an operating-lever for engaging said trip-lever in one direction and adapted to slip off said trip-lever at the end of the stroke of the operating-lever and to pass said trip-lever in the return movement of the operating-lever, and spring means for automatically causing said return movement.

2. In a photographic-shutter device, a shutter, actuating means for actuating the shutter in one direction, a beveled part moving with the shutter, a master-lever having a part adapted to engage and to slip off the said beveled part, a master-lever spring adapted to move said actuating means for actuating the master-lever to move the shutter in the other direction, a trip-lever engaging said master-lever, an operating-lever for engaging said trip-lever in one direction and adapted to slip off said trip-lever at the end of the stroke of the operating-lever and to pass said trip-lever in the return movement of the operating-lever, spring means for automatically causing said return movement, a pneumatic retarder mechanism embodying a retarder-lever, a controlling-lever adapted to be actuated by the master-lever and having a slip-off connection therewith, and a connection between the controlling-lever and said retarder-lever.

3. In a photographic-shutter device, a shutter, actuating means for actuating the shutter in one direction, a beveled part moving with the shutter, a master-lever having a part adapted to engage and to slip off the said beveled part, a master-lever spring adapted to move said actuating means for actuating the master-lever to move the shutter in the other direction, a trip-lever engaging said master-lever, an operating-lever for engaging said trip-lever in one direction and adapted to slip off said trip-lever at the end of the stroke of the operating-lever and to pass said trip-lever in the return movement of the operating-lever, spring means for automatically causing said return movement, a pneumatic retarder mechanism embodying a retarder-lever, a controlling-lever adapted to be actuated by the master-lever and having a slip-off connection therewith, and a variable connection between the controlling-lever and said retarder-lever.

4. In a photographic-shutter device, a shutter, a shutter-lever pivoted to the case and to said shutter and having a beveled part, a spring for actuating said shutter-lever, a master-lever having a laterally-movable part adapted to engage and to slip off the said beveled part of said shutter-lever, a master-lever spring stronger than said shutter-lever spring for actuating the master-lever to open the shutter, a trip-lever engaging said master-lever, and an operating-lever for engaging said trip-lever in one direction and adapted to slip off said trip-lever at the end of the stroke of the operating-lever.

5. In a photographic-shutter device, a shutter, a shutter-lever pivoted to the case and to said shutter and having a beveled part, a spring for actuating said shutter-lever, a master-lever having a laterally-movable part adapted to engage and to slip off the said beveled part of said shutter-lever, a master-lever spring stronger than said shutter-lever spring for actuating the master-lever to open the shutter, a trip-lever engaging said master-lever, an operating-lever for engaging said trip-lever in one direction and adapted to slip off said trip-lever at the end of the stroke of the operating-lever, a retarder mechanism embodying a retarder-lever, a controlling-lever adapted to be actuated by the master-lever and having a slip-off connection therewith, and a connection between the controlling-lever and said retarder-lever.

6. In a photographic-shutter device, a shutter, a shutter-lever pivoted to the case and to said shutter and having a beveled part, a spring for actuating said shutter-lever, a master-lever having a laterally-movable part adapted to engage and to slip off the said beveled part of said shutter-lever, a master-lever spring stronger than said shutter-lever spring for actuating the master-lever to open the shutter, a trip-lever engaging said master-lever, an operating-lever for engaging said trip-lever in one direction and adapted to slip off said trip-lever at the end of the stroke of the operating-lever, a retarder mechanism embodying a retarder-lever, a controlling-lever adapted to be actuated by the master-lever and having a slip-off connection therewith, and a variable connection between the controlling-lever and said retarder-lever.

7. In a photographic-shutter device, a shutter, an actuator for the same in one direction, a master-lever for moving the shutter in the other direction and for releasing the same, a retarder mechanism comprising a retarder-lever, a controlling-lever adapted to be actuated by the master-lever and having a slip-off connection therewith, and a variable connection between the controlling-lever and said retarder-lever.

8. In a photographic-shutter device, a shutter, an actuator for the same in one direction, a master-lever for moving the shutter in the other direction and for releasing the same, a retarder mechanism comprising a retarder-lever, a controlling-lever adapted to be actuated by the master-lever and having a slip-off connection therewith, and a changeable fulcrum connection between the controlling-lever and the retarder-lever.

9. In a photographic-shutter device, a shutter, an actuator for the same in one direction, a master-lever for moving the shutter in the other direction and for releasing the same, a retarder mechanism comprising a retarder-lever, a controlling-lever adapted to be actuated by the master-lever and having a slip-off connection therewith, a lever pivoted to the case, a link pivoted to the free end of the lever, and a pin on the end of said link adapted to constitute a shifting fulcrum common to the controlling-lever and to the retarder-lever.

10. In a photographic-shutter device, a shutter, an actuator for the same in one direction, a master-lever for moving the shutter in the other direction and for releasing the same, a retarder mechanism embodying a dash-pot, a retarder-lever controlling the action of the dash-pot and having a slot therein, a controlling-lever adapted to be actuated by the master-lever and having a slip-off connection therewith and an arm, the said retarder-lever and the said controlling-lever being pivoted at different points in the case, and a variable fulcrum movable in said slot of the retarder-lever and along said arm of the controlling-lever.

11. In a photographic-shutter device, a shutter, an actuator for the same in one direction, a master-lever for moving the shutter in the other direction and for releasing the same, a retarder mechanism embodying a dash-pot, a retarder-lever controlling the action of the dash-pot and having a slot therein, a controlling-lever adapted to be actuated by the master-lever and having a slip-off connection therewith and an arm, the said retarder-lever and the said controlling-lever being pivoted at different points in the case, a lever pivoted to the case, a link pivoted to the free end of said lever, and a pin on the end of said lever movable in said slot and along said arm to constitute a shifting fulcrum common to the controlling-lever and to the retarder-lever.

12. In a photographic-shutter device, a shutter, a shutter-lever pivoted to the case and to said shutter and having a beveled portion, an actuator for actuating said shutter-lever in one direction, a master-lever having a laterally-movable portion adapted to slip over and to engage said beveled portion of the shutter-lever, a master-lever spring stronger than said shutter-lever actuator for actuating the master-lever to open the shutter, a trip-lever engaging the master-lever, an operating-lever for engaging and moving said trip-lever in one direction and adapted to slip off said trip-lever at the end of the stroke of the operating-lever and to pass the trip-lever on its return stroke, means for automatically producing the return stroke of the operating-lever, and a bulb-detent adapted to check the master-lever before the end of its stroke and to release the same on the return movement of the operating-lever.

13. In a photographic-shutter device, a shutter, a shutter-lever pivoted to the case and to said shutter and having a beveled portion, an actuator for actuating said shutter-lever in one direction, a master-lever having a laterally-movable portion adapted to slip over and to engage said beveled portion of the shutter-lever, a master-lever spring stronger than said shutter-lever actuator for actuating the master-lever to open the shutter, a trip-lever engaging the master-lever, an operating-lever for engaging and moving said trip-lever in one direction and adapted to slip off said trip-lever at the end of the stroke of the operating-lever and to pass the trip-lever on its return stroke, means for automatically producing the return stroke of the operating-lever, and a time-detent adapted to engage and hold the master-lever before the end of its stroke and to engage and hold the operating-lever before the end of its return stroke and to release the master-lever and the operating-lever upon a second action of the operating-lever.

14. In a photographic-shutter device, a shutter, a shutter-lever pivoted to the case and to said shutter and having a beveled portion, an actuator for actuating said shutter-lever in one direction, a master-lever having a laterally-movable portion adapted to slip over and to engage said beveled portion of the shutter-lever, a master-lever spring stronger than said shutter-lever actuator for actuating the master-lever to open the shutter, a trip-lever engaging the master-lever, an operating-lever for engaging and moving said trip-lever in one direction and adapted to slip off said trip-lever at the end of the stroke of the operating-lever and to pass the trip-lever on its return stroke, means for automatically producing the return stroke of the operating-lever, a bulb-detent adapted to check the master-lever before the end of its stroke and to release the same on the complete return movement of the operating-lever, and a time-detent adapted to engage and hold the master-lever before the end of its stroke and to engage and hold the operating-lever before the end of its return stroke and to release the master-lever and the operating-lever upon a second action of the operating-lever.

15. In a photographic-shutter device, a shutter, a shutter-lever pivoted to the case and to said shutter and having a beveled portion, an actuator for actuating said shutter-lever in one direction, a master-lever having a laterally-movable portion adapted to slip over and to engage said beveled portion of the shutter-lever, a master-lever spring stronger than said shutter-lever actuator for actuating the master-lever to open the shutter, a trip-lever engaging the master-lever, an operating-lever for engaging and moving said trip-lever in one direction and adapted to slip off said trip-lever at the end of the stroke of the operating-lever and to pass the trip-lever on its return stroke, means for automatically producing the return stroke of the operating-lever, a bulb-detent adapted to check the master-lever before the end of its stroke and to release the same on the return movement of the operating-lever, and means for preventing the operation of said bulb-detent.

16. In a photographic-shutter device, a shutter, a shutter-lever pivoted to the case and to said shutter and having a beveled portion, an actuator for actuating said shutter-lever in one direction, a master-lever having a laterally-movable portion adapted to slip over and to engage said beveled portion of the shutter-lever, a master-lever spring stronger than said shutter-lever actuator for actuating the master-lever to open the shutter, a trip-lever engaging the master-lever, an operating-lever for engaging and moving said trip-lever in one direction and adapted to slip off said trip-lever at the end of the stroke of the operating-lever and to pass the trip-lever on its return stroke, means for automatically producing the return stroke of the operating-lever, a time-detent adapted to engage and hold the master-lever before the end of its stroke and to engage and hold the operating-lever before the end of its return stroke and to release the master-lever and the operating-lever upon a second action of the operating-lever, and means for preventing the operation of said time-detent.

17. In a photographic-shutter device, a shutter, a shutter-lever pivoted to the case and to said shutter and having a beveled portion, an actuator for actuating said shutter-lever in one direction, a master-lever having a laterally-movable portion adapted to slip over and to engage said beveled portion of the shutter-lever, a master-lever spring stronger than said shutter-lever actuator for actuating the master-lever to open the shutter, a trip-lever engaging the master-lever, an operating-lever for engaging and moving said trip-lever in one direction and adapted to slip off said trip-lever at the end of the stroke of the operating-lever and to pass the trip-lever on its return stroke, means for automatically producing the return stroke of the operating-lever, a bulb-detent adapted to check the master-lever before the end of its stroke and to release the same on the complete return movement of the operating-lever, a time-detent adapted to engage and hold the master-lever before the end of its stroke and to engage and hold the operating-lever before the end of its return stroke and to release the master-lever and the operating-lever upon a second action of the operating-lever, and means for simultaneously preventing the operation of the time-detent and the bulb-detent.

18. In a photographic-shutter device, a shutter, a shutter-lever pivoted to the case and to said shutter and having a beveled portion, an actuator for actuating said shutter-lever in one direction, a master-lever having a laterally-movable portion adapted to slip over and to engage said beveled portion of the shutter-lever, a master-lever spring stronger than said shutter-lever actuator for actuating the master-lever to open the shutter, a trip-lever engaging the master-lever, an operating-lever for engaging and moving said trip-lever in one direction and adapted to slip off said trip-lever at the end of the stroke of the operating-lever and to pass the trip-lever on its return stroke, means for automatically producing the return stroke of the operating-lever, a bulb-detent adapted to check the master-lever before the end of its stroke and to release the same on the complete return movement of the operating-lever, a time-detent adapted to engage and hold the master-lever before the end of its stroke and to engage and hold the operating-lever before the end of its return stroke and to release the master-lever and the operating-lever upon a second action of the operating-lever, means for causing engagement between the time-detent and the bulb-detent for actuating said bulb-detent by said time-detent, and means for preventing the action of the time-detent and for pressing said time-detent against said bulb-detent for simultaneously preventing the action of both detents.

ANDREW WOLLENSAK.

Witnesses:
D. GURNEE,
L. THON.